United States Patent
Geurts et al.

(10) Patent No.: US 8,881,064 B2
(45) Date of Patent: Nov. 4, 2014

(54) METHOD OF PROVIDING A USER INTERFACE

(75) Inventors: Lucas Jacobus Franciscus Geurts, Eindhoven (NL); Gavin Mark Proctor, Eindhoven (NL); Stuart Ronald Pill, Cramlington (GB); Angus David Dick, Eindhoven (NL); Daniel Karl Pezzutti, Eindhoven (NL); Floris Maria Hermansz Crompvoets, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 703 days.

(21) Appl. No.: 12/744,353

(22) PCT Filed: Nov. 21, 2008

(86) PCT No.: PCT/IB2008/054892
§ 371 (c)(1),
(2), (4) Date: May 24, 2010

(87) PCT Pub. No.: WO2009/069050
PCT Pub. Date: Jun. 4, 2009

(65) Prior Publication Data
US 2010/0257491 A1 Oct. 7, 2010

(30) Foreign Application Priority Data
Nov. 29, 2007 (EP) .................................. 07121839

(51) Int. Cl.
*G06F 3/033* (2013.01)

(52) U.S. Cl.
USPC ............ 715/863; 715/702; 715/716; 715/862

(58) Field of Classification Search
None
See application file for complete search history.

(56) References Cited

U.S. PATENT DOCUMENTS 5,704,836 A * 1/1998 Norton et al. .................... 463/36
6,616,284 B2 * 9/2003 Yaniv et al. ...................... 353/79

(Continued)

FOREIGN PATENT DOCUMENTS

EP 1241558 A2 9/2002
FR 2695745 A1 3/1994

(Continued)

OTHER PUBLICATIONS

Vogel et al: "Interactive Public Ambient Displays: Transitioning From Implicit to Explicit, Public to Personal, Interaction With Multiple Users"; Proceedings of the 17th Annual ACM Symposium on User Interface Software and Technology (UIST'04), Santa Fe, New Mexico, Oct. 24-27, 2004, pp. 137-146.

*Primary Examiner* — Anil N Kumar

(57) ABSTRACT

A method of providing a user interface for controlling a system (1;27) includes observing a presence of a body or body part of a user in a certain environment of a device (6,14-17;30). At least a perceptible part (28,34) of the user interface is made available to the user in association with a particular functionality for interacting with the system (1;27) controlled by the user interface in dependence on a rate of displacement of the body or body part of the user observed in the certain environment.

19 Claims, 3 Drawing Sheets

(56) References Cited

U.S. PATENT DOCUMENTS

| | | | |
|---|---|---|---|
| 7,676,767 B2* | 3/2010 | Hofmeister et al. | 715/863 |
| 8,239,784 B2* | 8/2012 | Hotelling et al. | 715/830 |
| 2002/0075334 A1* | 6/2002 | Yfantis | 345/863 |
| 2007/0120996 A1* | 5/2007 | Boillot | 348/345 |
| 2007/0139370 A1* | 6/2007 | Lu et al. | 345/156 |
| 2009/0128482 A1* | 5/2009 | Richardson | 345/156 |
| 2009/0216341 A1* | 8/2009 | Enkerud et al. | 700/17 |
| 2010/0162177 A1* | 6/2010 | Eves et al. | 715/863 |

FOREIGN PATENT DOCUMENTS

| | | |
|---|---|---|
| GB | 2406634 A | 4/2005 |
| JP | 07146770 A | 6/1995 |
| JP | 2002244810 A | 8/2002 |

\* cited by examiner

METHOD OF PROVIDING A USER INTERFACE

FIELD OF THE INVENTION

The invention relates to a method of providing a user interface for controlling a system.

The invention also relates to a system that provides a user interface for controlling the system.

The invention also relates to a computer programme.

BACKGROUND OF THE INVENTION

Vogel, D., Balakrishnan, R., "Interactive public ambient displays: transitioning from implicit to explicit, public to personal, interaction with multiple users", *Proc. 17th annual ACM symposium on user interface software and technology*, 2004, pp. 137-146, discloses an interaction framework for sharable, interactive public ambient displays that support the transition from implicit to explicit interaction with both public and personal information. The display and interaction techniques exploit implicit contextual cues such as body orientation and user proximity to the display, and explicit actions such as hand gestures and touch screen input. When the user approaches the display and provides an implicit cue such as pausing for a moment, the system should enter the subtle interaction phase. More detailed descriptions of the notifications and/or the current state of the available public information are displayed.

A problem of the known method is that the controls provided to the user are relatively unresponsive, in that they are provided in a binary manner, depending essentially on the distance. The detection of cues serves merely to cause transitions between states providing different functionalities, which are selected in dependence on the distance of the user to the display.

SUMMARY OF THE INVENTION

It is an object of the invention to provide a method, system, consumer electronics system and computer programme that allow different versions of the user interface to be made available in a way that is relatively responsive to user actions.

This object is achieved by the method according to the invention, which includes observing a presence of a body or body part of a user in a certain environment of a device and making at least a perceptible part of the user interface available to the user in association with a particular functionality for interacting with the system controlled by the user interface in dependence on a rate of displacement of the body or body part of the user observed in the certain environment.

By making at least a perceptible part of the user interface available to the user in association with a particular functionality for interacting with the system controlled by the user interface in dependence on a rate of displacement of the body or body part of the user observed in the certain environment, the rate of displacement becomes an input parameter or like an input parameter of a continuously or quasi-continuously variable kind, so that the range of user interface configurations that can be brought up by the user is increased. At least the perceptible part of the user interface can be simpler, because only the appropriate configuration is made available for subsequent use in controlling the system. Moreover, to make only an appropriate configuration of user interface available creates at least the potential for greater efficiency. The rate of displacement does not necessarily need to be calculated. By using at least three zones, in which the user interface changes from one zone to the next, a similar effect can be achieved. The body part may be a person's hand, for example.

An embodiment of the method includes changing a state of availability of at least an element of the user interface in response to a change in the rate of displacement of the body or body part of the user observed in the certain environment.

An effect is to make the user interface appear less cluttered, or at least to decrease the likelihood of confusion on the part of a user. The user interface changes from a state in which larger cognitive demands are made on a user (when many elements of the user interface are available), to one in which lower demands are made (when elements are not provided).

In an embodiment, at least the perceptible part of the user interface is caused to be made available to the user in a manner dependent on a location at which the body or body part of the user is observed to be present in the certain environment and the rate of displacement of the body or body part of the user.

An effect is to expand the extent of control that a user can exercise over the configuration of the user interface. This is because two input variables serve as input for adjusting that configuration.

An embodiment of the method includes adjusting at least part of a configuration of the user interface at a rate dependent on the rate of displacement of a body or body part of the user observed in the certain environment.

An effect is to make the user interface more intuitive, since one rate of change (of a position of a user's body part) is linked to another rate of change (of the configuration of the user interface).

In an embodiment, wherein the user interface includes a device for providing a visible output, the method includes providing a signal to configure the visible output to the device.

An effect is to make the user interface easy to implement, since it is relatively simple to change the appearance of an interface provided using a display device.

A variant includes detecting at least one of presence at and approach to a part of the device providing a visible output, which part corresponds to an element of the visible output.

Thus, the configuration of a set of touch-sensitive controls is changed relatively easily, dependent at least in part on how fast a user approaches a device included in the observation system.

An embodiment includes adjusting a state of visibility of at least an element of the visible output associated with a particular functionality at a rate determined by the rate of displacement of the body or body part.

An effect is to prevent the user from taking actions with unintended consequences, since the transition to full visibility is gradual. The provision of feedback in the form of a state of visibility changing at a rate determined by a rate of displacement ensures that the user interface changes in a sufficiently responsive manner. The rate of displacement may be a rate determined in terms of the time between transitions from one discrete zone within the certain environment to the next.

An embodiment includes providing one of a plurality of controls associated with respective different actions of the system controlled by the user interface in dependence on the displacement of the body or body part observed in the certain environment.

An effect is to simplify the user interface, since only relevant controls are made available, the relevance being assessed by observing the displacement of a moving body or body part.

In an embodiment, the user interface is provided for controlling a user interface of a consumer electronics system.

The consumer electronics system has a re-configurable user interface that is responsive to a relatively wide range of input information.

According to another aspect, the system for providing a user interface according to the invention includes:

a signal processing component for processing at least one signal from an observation component for observing the presence of a body or body part of a user in a certain environment of a device, and a control component for making at least a perceptible part of the user interface available to the user in association with a particular functionality for interacting with the system controlled by the user interface in dependence on a rate of displacement of the body or body part of the user observed in the certain environment.

The system can be more responsive than a binary system, since it is capable of processing a wider range of input.

In an embodiment, the system is arranged to carry out a method according to the invention.

According to another aspect of the invention, there is provided a computer programme including a set of instructions capable, when incorporated in a machine-readable medium, of causing a system having information processing capabilities to perform a method according to the invention.

BRIEF DESCRIPTION OF THE DRAWINGS

The invention will now be explained in further detail with reference to the accompanying drawings, in which.

DETAILED DESCRIPTION OF THE EMBODIMENTS

Figure 1:
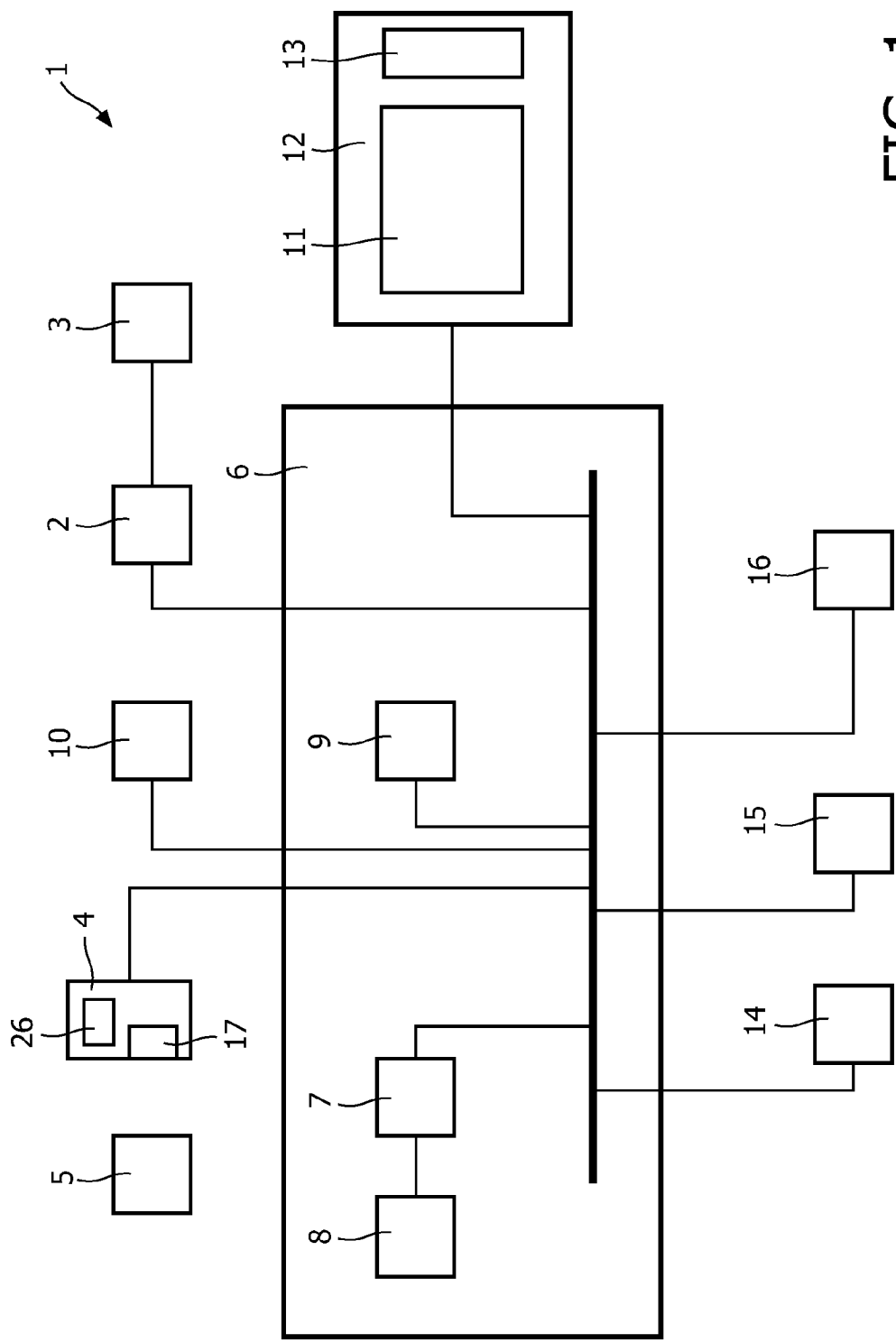
FIG. 1 is a very schematic block diagram of a home entertainment system.

As illustrated in FIG. 1, a home entertainment system 1 includes a media player 2 and television set 3. It further includes a docking station 4 for a portable media player 5.

The home entertainment system 1 is at least partly controlled by a hub 6. The hub 6 includes a data processing unit 7 and main memory 8 for running software enabling the user interface to be provided. The software is stored on a data storage device 9, along with data defining several configurations of user interface. The user interface comprises an assembly of means by which people can interact with the home entertainment system 1, including input means allowing a user to manipulate the system and output means allowing the system to present information representative of the effects of the user's manipulations.

In the illustrated embodiment, the output means include a speaker 10 for providing audible output and a display device 11 for providing visible output. The display device 11 is comprised in a touch screen device 12, further including a device 13 for determining a location on the display device at which a body part (or whole body), perhaps holding a certain other object, is held in close proximity or touching relationship.

The hub 6 is operatively connected to an infra-red transducer 14, an ultrasound transducer 15 and a camera 16. The infra-red transducer 14 is capable of detecting objects at greater distances than the ultrasound transducer 15, which is in turn operative over a larger range than the camera 16. Other embodiments than the one illustrated in FIG. 1 may make use of fewer than all of these devices for observing at least part of the environment of the hub 6 for the presence of a body part of the user. In another embodiment, the presence of a body part of the user is observed only indirectly, by determining the presence of a tag held or warn by the user. Indeed, in the illustrated embodiment, the docking station 4 also includes a distance sensor 17 for observing the approach of the portable media player 5 to the docking station 4, and thus indirectly the approach of the hand holding the portable media player.

The hub 6 processes at least one of the signals provided by the infra-red transducer 14, the ultra-sound transducer 15, the camera 16 and the distance sensor 17, and causes at least one element of the user interface to be made available to the user in a manner dependent on a rate of displacement of a moving body part observed in a certain environment of the hub 6. More specifically, the speed of approach is used as a variable in determining at least one of whether, to what extent, and in which mode to engage certain elements of the user interface, be they output means or user controls.

To provide a graphical user interface that is appealing to the eye, unlikely to confuse a user and has no obfuscating interfaces that make it appear cluttered, the hub 6 normally hides all visible output for the display device 11 from the user. The infra-red transducer 14, ultrasound transducer 15 and camera 16 are continuously used to detect the presence, distance (state 18) and direction of movement (state 19) of a body or body part of a user within a given periphery of the hub 6. Based on the signals from one or more of these devices, the speed of approach of a moving body part is determined (state 20).

In an example, the interface becomes active once a user's body part is detected within a certain range $r_2$ of the hub 6.

Figure 2:
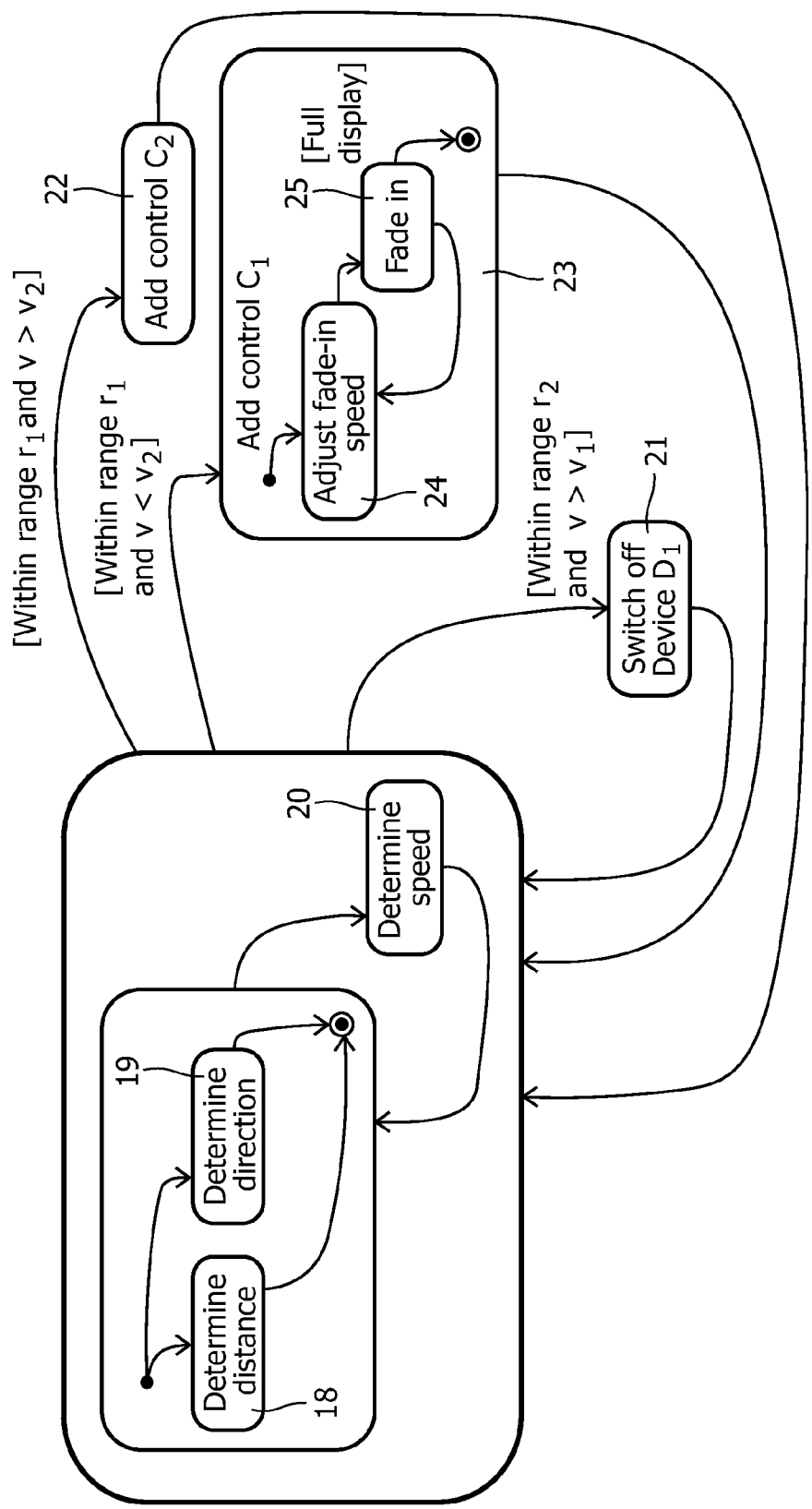
FIG. 2 is a state diagram illustrating functions of a user interface of the home entertainment system.

As illustrated in FIG. 2, the state of availability of audio output is changed (state 21) upon determining that the body part is within range and approaches at a speed (rate of displacement) greater than a given threshold $v_1$. In the illustrated embodiment, the speaker 10 is switched off.

Otherwise, a signal is provided to the touch screen device 12 to configure the visible output on the display device 11 in dependence on at least the speed of approach (i.e. rate of displacement). As illustrated in FIG. 2, a part of the screen of the display device 11 corresponds to a particular element of the visible output, and the presence at and approach to that part of the screen of a finger or stylus is detectable, such that a user control is provided. In the illustrated embodiment, one of two controls $C_1$, $C_2$ is provided, each associated with different actions of the media player 2. Which one is provided depends on the approach speed of the user's limb or an implement held by the user. If the speed of approach is greater than a second threshold value $v_2$, then a second of the two controls is presented (state 22) on the touch screen device 12. Otherwise, a first control $C_1$ is presented (state 23).

The first control is presented in a time-varying manner dependent on the speed of approach to the hub 6. The hub 6 varies (state 24) the speed at which the first control is faded in (state 25) in dependence on the speed of approach, by providing the appropriate signals to the display device 11. Thus, the configuration of the graphical part of the user interface is adjusted at a rate dependent on the rate of displacement observed.

In a variant, similar principles are applied to provide feedback when the portable media player 5 is placed in the docking station 4. The docking station 4 comprises a lighting device 26 for providing lighting effects. Dependent on the rate at which the portable media player 5 approaches the docking station 4, the light output is increased. If the speed of approach exceeds a certain threshold value, a different lighting effect is selected, e.g. the lighting device 26 provides a flashing light effect.

In a further variant, the speed of approach is not calculated directly, but making at least a perceptible part of the user interface available to the user in association with a particular functionality for interacting with the system controlled by the user interface depends indirectly on a rate of a displacement of a body or body part of the user observed in the certain environment, the displacement being determined in stages/zones. In particular, the state of visibility of a lighting effect provided by the lighting device 26 is adjusted at a rate at which the portable media player 2 crosses each of a plurality of distance thresholds. This occurs inherently as the distance sensor 17 senses the crossing of distance thresholds and the lighting device 26 is adjusted in real-time or quasi real-time.

Figure 3:
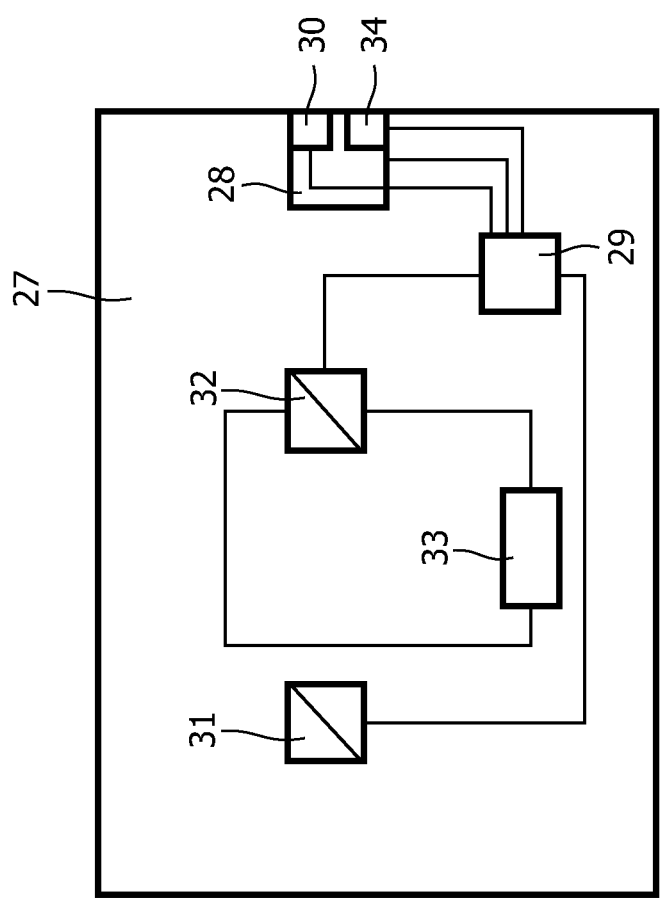
FIG. 3 is a simple diagram of parts of a coffee machine provided with a user interface for controlling the coffee machine.

Turning to a simpler example of a device provided with a user interface, FIG. 3 illustrates a coffee maker 27. A mechanical switch 28 constitutes a perceptible part of a user interface for controlling the coffee maker 27. A controller 29 receives signals from the switch and a sensor 30 for determining the rate at which a user's hand approaches the switch 28. If the rate of approach is higher than a certain threshold level, the controller 29 regulates a valve 31 in a hot water conduit (not shown). If the rate of approach is lower than a certain threshold level, the controller 29 provides a signal activating or de-activating a regulator 32 for a heating device 33. Thus, rapid action to press the switch 28 serves as a cue that the switch 28 should be provided in such a manner that its engagement results in a first action (stop pouring coffee). Slow action serves as a cue that the functionality attached to the switch should be changed to allow it to switch the coffee maker 27 on or off. To make the user interface easier to use, the current functionality of the switch 28 is indicated by means of an OLED display device 34 on the switch.

In the embodiments described in detail above, either the elements of the user interface providing perceptible feedback on the functioning of the system to be controlled or the elements allowing the user to provide input to control the system, or both, are provided in a manner dependent on the speed at which a body or body part of the user is observed to approach. A wider range of user interface configurations can be provided without reducing the clarity of the user interface as it is actually perceived by the user.

In all variants, the process of making at least a perceptible part of the user interface available to the user in association with a particular functionality for interacting with the system controlled by the user interface is adapted in dependence on a rate of a displacement of the body or body part of the user observed in the certain environment. The adaptation can involve making a different functionality available in association with a particular perceptible part of the user interface, making a different combination of perceptible parts of the user interface available in combination with a particular functionality or adapting the manner in which a fixed combination of a perceptible part of the user interface and a particular functionality are made available, e.g. fading in a visually perceptible part of the user interface.

It should be noted that the embodiments described above illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In another embodiment, instead of using the touch screen device 12, a surface of a device could by provided with a display device based on electronic ink or electrowetting display technique, so as to display graphics. Instead of using the infrared transducer 14, ultrasound transducer 15 or camera 16, proximity sensing can be carried out using RFID or other wireless transmission technology.

'Means', as will be apparent to a person skilled in the art, are meant to include any hardware (such as separate or integrated circuits or electronic elements) or software (such as programs or parts of programs) which perform in operation or are designed to perform a specified function, be it solely or in conjunction with other functions, be it in isolation or in co-operation with other elements. 'Computer programme' is to be understood to mean any software product stored on a computer-readable medium, such as an optical disk, downloadable via a network, such as the Internet, or marketable in any other manner.

The invention claimed is:

1. A method of providing a user interface for controlling a system, including the acts of:
   observing a presence of a body or body part of a user in a certain environment of a device;
   making a perceptible part of the user interface available to the user in association with a particular functionality for interacting with the system controlled by the user interface in dependence on a rate of displacement of the body or body part of the user observed in the certain environment;
   hiding remaining parts of the user interface, the remaining parts being parts other than the perceptible part made available to the user; and
   providing on the user interface one control selected from at least one of a first control associated with a first action to control the device and a second control associated with a second action to control the device, wherein which one of the first control and second control being the selected control provided on the user interface depends on an approach speed of the body or the body part of the user such that when the approach speed is greater than a threshold value, then the second control is provided on the user interface, otherwise the first control is provided on the user interface, the first action responsive to activation of the first control provided on the user interface being different from the second action responsive to activation of the second control provided on the user interface, wherein the perceptible part of the user interface is caused to be made available to the user in a manner dependent on a location at which the body or body part of the user is observed to be present in the certain environment and the rate of displacement of the body or body part of the user.

2. The method according to claim 1, further comprising changing a state of availability of at least an element of the user interface in response to a change in the rate of displacement of the body or body part of the user observed in the certain environment.

3. The method according to claim 1, further comprising adjusting at least part of a configuration of the user interface at a rate dependent on the rate of displacement of the body or body part of the user observed in the certain environment.

4. The method according to claim 1, wherein the user interface includes a device for providing a visible output, and wherein the method further comprises the act of providing a signal to configure the visible output to the device.

5. The method according to claim 4, further comprising detecting at least one of presence at and approach to a part of the device providing a visible output, wherein the part corresponds to an element of the visible output.

6. The method according to claim 4, including adjusting a state of visibility of at least an element of the visible output associated with a particular functionality at a rate determined by the rate of displacement of the body or body part of the user observed in the certain environment.

7. The method according to claim 1, wherein the user interface is provided for controlling a user interface of a consumer electronics system.

8. A system comprising:
a processor;
a signal processing component configured to process at least one signal from an observation component for observing a presence of a body or body part of a user in a certain environment of a device; and
a control component configured to make a perceptible part of a user interface available to the user in association with a particular functionality for interacting with the system controlled by the user interface in dependence on a rate of displacement of the body or body part of the user observed in the certain environment, wherein the control component is further configured to hide remaining parts of the user interface, the remaining parts being parts other than the perceptible part made available to the use; and wherein the control component is further configured to provide on the user interface one control selected from at least one of a first control associated with a first action to control the device and a second control associated with a second action to control the device, wherein which one of the first control and second control being the selected control provided on the user interface depends on an approach speed of the body or the body part of the user such that when the approach speed is greater than a threshold value, then the second control is provided on the user interface, otherwise the first control is provided on the user interface, the first action responsive to activation of the first control provided on the user interface being different from the second action responsive to activation of the second control provided on the user interface, wherein the perceptible part of the user interface is caused to be made available to the user in a manner dependent on a location at which the body or body part of the user is observed to be present in the certain environment and the rate of displacement of the body or body part of the user.

9. A non-transitory computer readable medium embodying comprising computer instructions which, when executed by a processor, configure the processor to perform the acts of:
observing a presence of a body or body part of a user in a certain environment of a device;
making a perceptible part of the user interface available to the user in association with a particular functionality for interacting with the system controlled by the user interface in dependence on a rate of displacement of the body or body part of the user observed in the certain environment;
hiding remaining parts of the user interface, the remaining parts being parts other than the perceptible part made available to the user; and
providing on the user interface one control selected from at least one of a first control associated with a first action to control the device and a second control associated with a second action to control the device, wherein which one of the first control and second control being the selected control provided on the user interface depends on an approach speed of the body or the body part of the user such that when the approach speed is greater than a threshold value, then the second control is provided on the user interface, otherwise the first control is provided on the user interface, the first action responsive to activation of the first control provided on the user interface being different from the second action responsive to activation of the second control provided on the user interface, wherein the perceptible part of the user interface is caused to be made available to the user in a manner dependent on a location at which the body or body part of the user is observed to be present in the certain environment and the rate of displacement of the body or body part of the use.

10. The method of claim 1, further comprising the act of gradually transitioning the user interface to full visibility.

11. The system of claim 8, wherein the control component is further configured to gradually transition the user interface to full visibility.

12. The method of claim 1, wherein the observing act observe the presence of the body or the body part of the user indirectly by determining a presence of a tag held or warn by the user.

13. The system of claim 8, wherein the observation component is configured to observe the presence of the body or the body part of the user indirectly by determining a presence of a tag held or warn by the user.

14. The non-transitory computer readable medium of claim 9, the observing act observe the presence of the body or the body part of the user indirectly by determining a presence of a tag held or warn by the user.

15. The method of claim 1, wherein the rate of displacement of the body or the body part of the user is speed of approach of the body or the body part of the user towards the device, and the method further comprises the act of fading the first control at a rate that depends from the speed of approach of the body or the body part of the user towards the device.

16. The system of claim 8, wherein the rate of displacement of the body or the body part of the user is speed of approach of the body or the body part of the user towards the device, and the control component is further configured to fade the first control at a rate that depends from the speed of approach of the body or the body part of the user towards the device.

17. The non-transitory computer readable medium of claim 9, wherein the rate of displacement of the body or the body part of the user is speed of approach of the body or the body part of the user towards the device, and the method further comprises the act of fading the first control at a rate that depends from the speed of approach of the body or the body part of the user towards the device.

18. The method of claim 1, wherein the observing act is performed continuously to detect the presence, distance and direction of movement of the body or the body part of the user within a predetermined periphery of the device.

19. The system of claim 8, wherein the observation component is configured to continuously to detect the presence, distance and direction of movement of the body or the body part of the user within a predetermined periphery of the device.

* * * * *